A. W. Park,
Wrench.

N°48,027. Patented May 30, 1865.

Witnesses: Inventor:

UNITED STATES PATENT OFFICE.

A. W. PARK, OF NORWICH, CONNECTICUT, ASSIGNOR TO HIMSELF AND C. J. WINTERS, OF SAME PLACE.

IMPROVEMENT IN TOOLS.

Specification forming part of Letters Patent No. 48,027, dated May 30, 1865.

*To all whom it may concern:*

Be it known that I, A. W. PARK, of Norwich, in the county of New London and State of Connecticut, have invented a new and useful Improvement in Tools; and I do hereby declare that the following is a full, clear, and exact description thereof, which will enable others skilled in the art to make and use the same, reference being had to the accompanying drawings, forming a part of this specification, in which—

Figure 1:
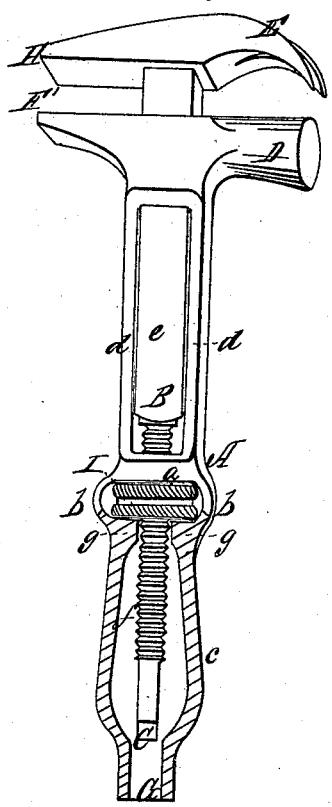
Figure 2:

Figure 1 represents a combination of several tools made according to my invention, the lower part of the handle being shown in section. Fig. 2 is an end view of the handle.

Similar letters of reference indicate like parts.

This invention consists in a combination, in a peculiar manner, of several different tools, so as to join in the same implement a hammer, a claw, a screw-driver, a socket-wrench, and a monkey-wrench, the whole implement consisting of only two pieces and a nut, by which said pieces are connected to and adjusted with each other.

B is a shank composed of a rectangular part, $e$, a screw-threaded part, $f$, and a wedge-shaped end, which is formed into a screw-driver, C. The upper end of the shank B carries a claw, E, and a face, F, the latter serving the purpose of the upper face of a monkey-wrench, as hereinafter explained. The claw E and face F are parts of the same piece of metal, which piece is secured at right angles to the upper end of the shank B.

D is a hammer, having a toe, F', at its end with a straight face, which extends in a line parallel with the face F, before mentioned. The handle A of the hammer consists of two straight bars, $d\ d$, which extend, respectively, from before and behind the eye of the hammer for a distance rather exceeding one-half the length of the handle and a tubular part, $c$. The straight bars $d\ d$ are separated from the part $c$ by cross-bars $a$, which extend across from edge to edge of the bars $d$ on both sides of the handle, only one of said cross-bars $a$ being seen in the drawings, and below said bars by swells $b\ b$, which terminate in the sides of the tubular part $c$, and which are formed by expanding the bars $d\ d$ below the cross-bars.

The upper end of the tubular part $c$ of the handle is contracted at $g\ g$, so as to form shoulders, which are parallel with the cross-bars $a$ above.

I is a nut, which works in the open space bounded by the bars $a$, the shoulders $g\ g$, and the expanded sides $b\ b$. The shank B is inserted through the eye of the hammer, its screw-threaded part $f$ passing between the cross-bars $a$, through the nut I, and between the shoulders $g\ g$. When the shank is screwed down so as to bring the faces F F' together, the plane part $e$ will be flush with the edges of the bars $d\ d$, thus giving smoothness to that part of the handle. The lower end of the tubular part $c$ of the handle is contracted, and its inner sides are formed into a socket-wrench, as represented in Fig. 2. The part $f$ of the shank B has a double screw-thread cut thereon, for the purpose of securing a rapid movement of the handle through the nut I, and at the same time giving strength to the handle and steadiness to it when in motion.

When it is desired to use this implement as a socket-wrench, the hammer and claw parts serve as a convenient handle for operating it. When it is desired to use it as a hammer, the claw part may be slightly separated from the hammer, as shown in Fig. 1; or the two may be together, without thereby preventing the proper use of the hammer. When it is to be used as a claw, the part E should be separated from the hammer a little. When it is to be used as a monkey-wrench, the claw and hammer are separated, so as to bring the faces F F' a suitable distance apart to suit the bolt-head or nut to be turned. When it is to be used as a screw-driver, the shank B is withdrawn entirely from the handle A. A double thread is also formed in the nut I, to fit the threads of the shank.

Having thus described my invention, I claim as new and desire to secure by Letters Patent—

The implement above shown, comprising a combined hammer, claw, monkey-wrench, socket-wrench, and screw-driver, substantially as described.

A. W. PARK.

Witnesses:
 DAVID YOUNG,
 DENISON CHAMPLIN.